United States Patent [19]
Wood et al.

[11] Patent Number: 6,118,205
[45] Date of Patent: Sep. 12, 2000

[54] TRANSDUCER SIGNAL WAVESHAPING SYSTEM

[75] Inventors: Robert P. Wood, San Carlos; Serge Plotkin, Belmont; Jacob Harel, San Francisco; Alfred Samson Hou, Sunnyvale, all of Calif.

[73] Assignee: Electronics for Imaging, Inc., Foster City, Calif.

[21] Appl. No.: 09/134,315

[22] Filed: Aug. 13, 1998

[51] Int. Cl.[7] .................................................. H01L 41/08
[52] U.S. Cl. ...................................... 310/316.01; 310/317
[58] Field of Search ........................ 310/316.01, 316.03, 310/317, 318, 319

[56] References Cited

U.S. PATENT DOCUMENTS

| | | | |
|---|---|---|---|
| 3,681,626 | 8/1972 | Puskas | 310/316.01 |
| 3,708,701 | 1/1973 | Kawada . | |
| 4,333,434 | 6/1982 | Brunais et al. | 123/478 |
| 4,588,917 | 5/1986 | Ratcliff | 310/317 X |
| 4,767,959 | 8/1988 | Sakakibara et al. | 310/317 |
| 5,036,263 | 7/1991 | Yamada et al. | 310/316.03 X |
| 5,057,734 | 10/1991 | Tsuzuki et al. | 310/317 |
| 5,130,598 | 7/1992 | Verheyen et al. | 310/317 X |

*Primary Examiner*—Mark O. Budd
*Attorney, Agent, or Firm*—Michael A. Glenn; Donald M. Hendricks

[57] ABSTRACT

A transducer signal waveshaping system is provided, in which a signal excitation circuit includes a non-linear device. The resulting circuit produces a short input pulse, which allows a piezoelectric transducer to transmit a shortened output signal having distinct waveshape characteristics. The resulting waveshaped output signal, typically an ultrasonic signal, provides a measurable time-dependent signal that is particularly suited for data entry systems, such as for movable transmitter pens and white boards. The location of the transmitter pen in relation to the writing area of a white board can be determined, using the periodic transmission of the waveshaped output signals. Alternative embodiments include additional circuit elements, which allow the resulting waveshaped output signal to include even more distinctive waveform features. The distinctive waveform features allow the transmitter pen to be located even more accurately, and provide a means for transferring supplementary information, such as pen up vs. pen down distinction, and determined pen characteristics, such as pen color, pen line width, and pen user.

22 Claims, 13 Drawing Sheets

TRANSDUCER SIGNAL WAVESHAPING SYSTEM

FIELD OF THE INVENTION

The invention relates to the field of electronic transducers. More particularly, the invention relates to a system for shaping the transmitted waveform from an electronic transducer.

BACKGROUND OF THE INVENTION

Digitizing pen and tablet systems are used for a variety of electronic applications. These systems typically include a tablet, a position indicating pen, and associated electronics for determining the interaction between the writing surface and the position indicating pen. A digital data signal is typically derived to represent the relative position of the position indicating pen and the writing surface.

In prior art position indicating pens, an excitation circuit powers a signal transducer, producing a long-duration transmission signal waveform, or ringing, which then slowly decays. The wide transmission signal is then transmitted from the position indicating pen to external receivers. The wide transmission signal waveform is then analyzed, to determine the relative time for the signal to reach each receiver. The location of the pen is then determined, based on triangulation methods. Since the receiver is required to approximate where on each of the wide transmission signal waveforms to designate the estimated path length, the resulting determined pen location can be inaccurate.

Also, the resulting wide waveform requires that the period between subsequent output signals be extended, which results in less frequent updates for the current position of the pen. When a user directs a pen quickly across a writing area, such as a white board, the stroke of the pen is not accurately captured when the period between subsequent transmitter signals is large.

M. Phillips, T. Philbin, and B. Blesser, Coordinate Determining Device Using Spatial Filters, U.S. Pat. No. 4,963,703 (Oct. 16, 1990) disclose a digitizing tablet, in which "two sets of circuitous conductive lines form grids each connected at one end to a surrounding conductive loop. All outputs are measured from the conductive loop as a multiplexor sequentially grounds the grids one at a time. The outputs are fed through linear spatial filters which are used to produce intermediate signals which are in turn combined to arrive at raw position signals for a position indicating coil located over the work surface. Separate sets of linear spatial filters may be used to produce two raw position signals differently responsive to tilt which can then be combined to arrive at a true position insensitive to tilt". Phillips et al. also disclose a stylus having a single conductive coil, which is used as a position indicating implement over a work surface.

S. Payne, Ultrasonic Generator Drive Circuit, U.S. Pat. No. 3,975,650 (Aug. 17, 1976) discloses an ultrasonic generator, which "comprises a transducer which is adapted to vibrate in a fundamental frequency mode and the harmonic thereof in response to a square wave signal which is applied thereto. The transducer is a piezoelectric type which has a capacitor loading effect. A square wave generator is provided for generating a square voltage wave and driving means comprising high speed switching transistors is responsive to the signal from the square wave generator for driving the transducer with a square wave. The transistors are switchable between conducting and non-conducting states and are connected to the square wave generator so that the transistors are switched in phase opposition to each other. A non-resistant inductor connects the pair of transistors with the transducer to limit current flow and to permit application of the square wave to the transducer. An alternate embodiment utilizes a balancing transformer to eliminate the normal high common mode switching circuit".

T. Kuwabara, Booster Circuit, U.S. Pat. No. 3,824,447 (Jul. 16, 1974) discloses a booster circuit which "comprises a booster circuit capacitor and a plurality of capacitors, which are connected in parallel to a booster power supply for being charged when a voltage of a first level is applied to an input terminal of the booster circuit and, on the other hand, connected in series with each other when a voltage of a second level is applied thereto. The alternate application of the voltages having the first and second levels in repetitive manner allows the generation of a boosted voltage across the booster output capacitor.

J. Moriki, M. Shioji and T. Itoh, Drive Circuit for Piezoelectric High Voltage Generating Device, U.S. Pat. No. 4,054,806 (Oct. 18, 1977) disclose a high voltage generating device utilizing a piezoelectric transformer in which an inductance is connected between one of the drive electrodes of the piezoelectric transformer and an output terminal of a drive source, and a capacitor is connected across the two drive electrodes so that a variation of the output voltage of the device due to a change in the load is minimized. In addition, the effective range of the frequency characteristic of the output voltage is expanded and the temperature characteristic of the output voltage is improved.

D. Martinkovic, High Speed-High Voltage Switching for Low Power Consumption, U.S. Pat. No. 4,070,589 (Jan. 24, 1978) discloses a circuit in which "a capacitive load is charged through a series transistor. Peak charge currents for the load are drawn from a capacitive source whose charge is constantly maintained. Rapid discharge of the capacitive load is through a semiconductor diode and a cascade of transistors which act as switching elements".

L. Duren and A. Andersson, Ultrasonic Generators, U.S. Pat. No. 3,694,713 (Sep. 26, 1972) disclose "an ultrasonic generator including an amplifier coupled in oscillator configuration for initiating via an exciting impedance ultrasonic vibrations in an electro-acoustic element such as that associated with a dental implement. Connected in parallel with the exciting impedance is an additional impedance to form a tuned parallel resonance circuit. Maximum current is supplied to the exciting impedance through the amplifier and the primary winding of a current transformer also having a secondary winding connected in series with a capacitor to form a tuned series resonance circuit additionally emphasizing the maximum current".

I. Bourgeois, H. Daniels and R. Verlet, Arrangement for Generating Ultrasonic Oscillations, U.S. Pat. No. 3,819,961 (Jun. 25, 1974) disclose "a control circuit for a transducer comprising a tunable oscillator for driving the transducer at resonance, and a feedback loop responsive to the transducer comprising a phase detector which develops a series of pulse width modulated binary pulses, a D.C. source, an integrator, and various switching means to control the tunable oscillator".

I. Gilchrist, Circuit for Driving an Acoustic Transducer, U.S. Pat. No. 5,073,878 (Oct. 31, 1990) disclose a driver circuit for an acoustic transducer, which "includes a voltage regulator that provides a regulated DC output level for a high value load impedance and when the load impedance falls to a low value, its DC output exhibits a substantially reduced level. A transformer is connected between the voltage regulator and the acoustic transducer. A switching circuit is connected to the transformer and is responsive to a leading edge of a pulse input signal to reflect a low value impedance through the transformer to the voltage regulator. The switching circuit is further responsive to a lagging edge of a pulse input signal to reflect a high value impedance to the voltage regulator. A capacitive reactance circuit is coupled to the transformer and is responsive to the switching circuit reflecting a low value impedance to manifest a reduced charge state. When the switching circuit receives the lagging edge of the pulse input signal, the capacitive reactance circuit is recharged to the regulated DC output level, but over a charge time which prevents a step function signal from appearing across the transformer".

R. Hose, K. Riordan and S. Martin, Voltage Amplifier Circuit, U.S. Pat. No. 4,053,821 (Oct. 11, 1977) disclose a voltage multiplier circuit "which converts a relatively low voltage to a relatively high voltage with any undesirable voltage drops across any of the constituent components. A plurality of the disclosed voltage multiplier circuits may be cascaded together to increase the multiplied output voltage, wherein each multiplier stage of the cascaded circuits multiplies the input voltage by two".

K. Takehiko, Apparatus for Driving Piezoelectric Transformers, U.S. Pat. No. 3,708,701 (Jan. 2, 1973) discloses an apparatus for driving a transducer in which a resonance circuit is "comprised by an inductance and a capacitance connected in parallel and connected across the input electrodes of the transducer, and means for supplying a periodic pulse current of narrow width to the resonance circuit thereby driving the piezoelectric transducer by the energy delivered by the resonance circuit".

The disclosed prior art systems and methodologies thus provide circuits that can be used to power transducers, but fail to provide a circuit that powers a transducer with a short pulse input signal, which allows a the transducer to transmit a shortened output signal having distinct waveshape characteristics. The development of such a transducer input system would constitute a major technological advance.

SUMMARY OF THE INVENTION

A signal waveshaping system is provided, in which a signal excitation circuit includes a non-linear device that aids in the damping of signal waveforms. The resulting circuit produces a short input waveform, which allows a piezoelectric transducer to transmit a shortened output signal having distinct waveshape characteristics. The resulting waveshaped output signal, typically an ultrasonic signal, provides a measurable time-dependent signal that is particularly suited for movable transmitter pen and white board systems. The location of the transmitter pen in relation to the writing area of a white board can be determined, using the periodic transmission of the waveshaped output signals from the movable transmitter pen to remote receivers. Alternative embodiments include input signal conditioning, additional circuit elements, or output signal conditioning within the transmitter pen, which allow the resulting waveshaped output signal to include even more distinctive waveform features, allowing more accurate location signals and providing a means for transferring supplementary information, such as pen up vs. pen down distinction, and determined pen characteristics, such as pen color, pen line width, and pen user.

DETAILED DESCRIPTION OF PREFERRED EMBODIMENTS

Figure 1:
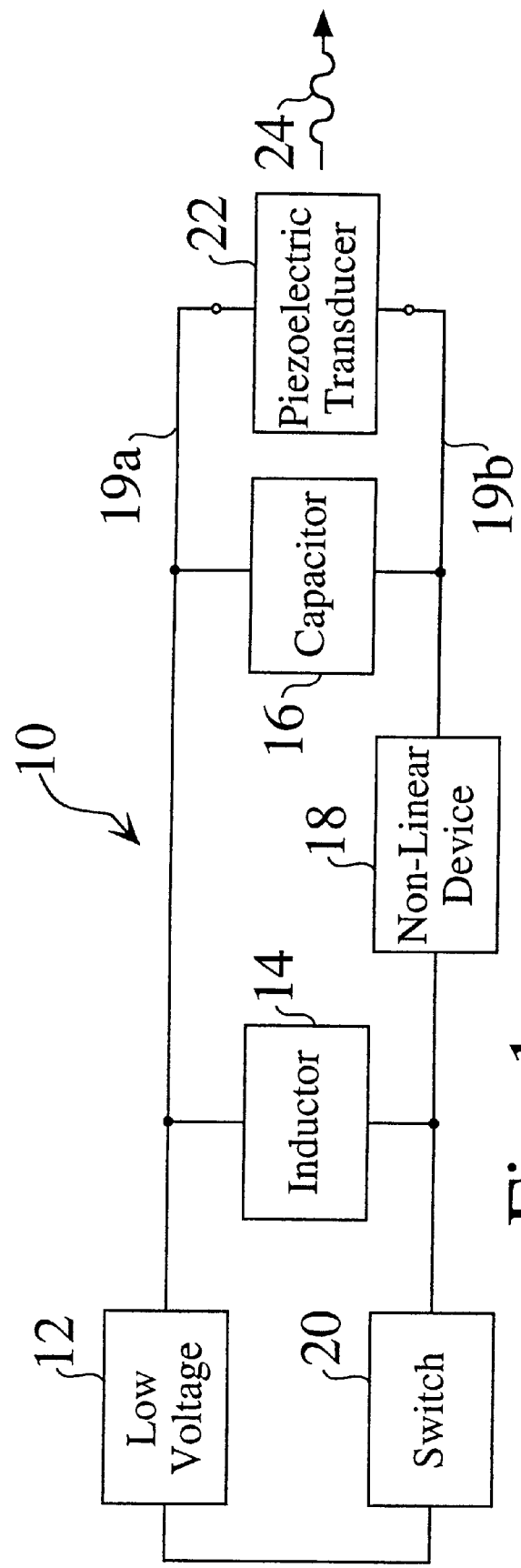
FIG. 1 is a block diagram of a signal waveshaping circuit.

FIG. 1 is a block diagram of a signal waveshaping circuit 10. The signal waveshaping circuit 10 includes an inductor 14 and a capacitor 16, which oscillates when activated by a low voltage source 12 to produce a transducer input signal 44. The signal waveshaping circuit 10 also includes a non-linear device 18 having a lossy threshold between the inductor 14 and the capacitor 16.

Figure 2:
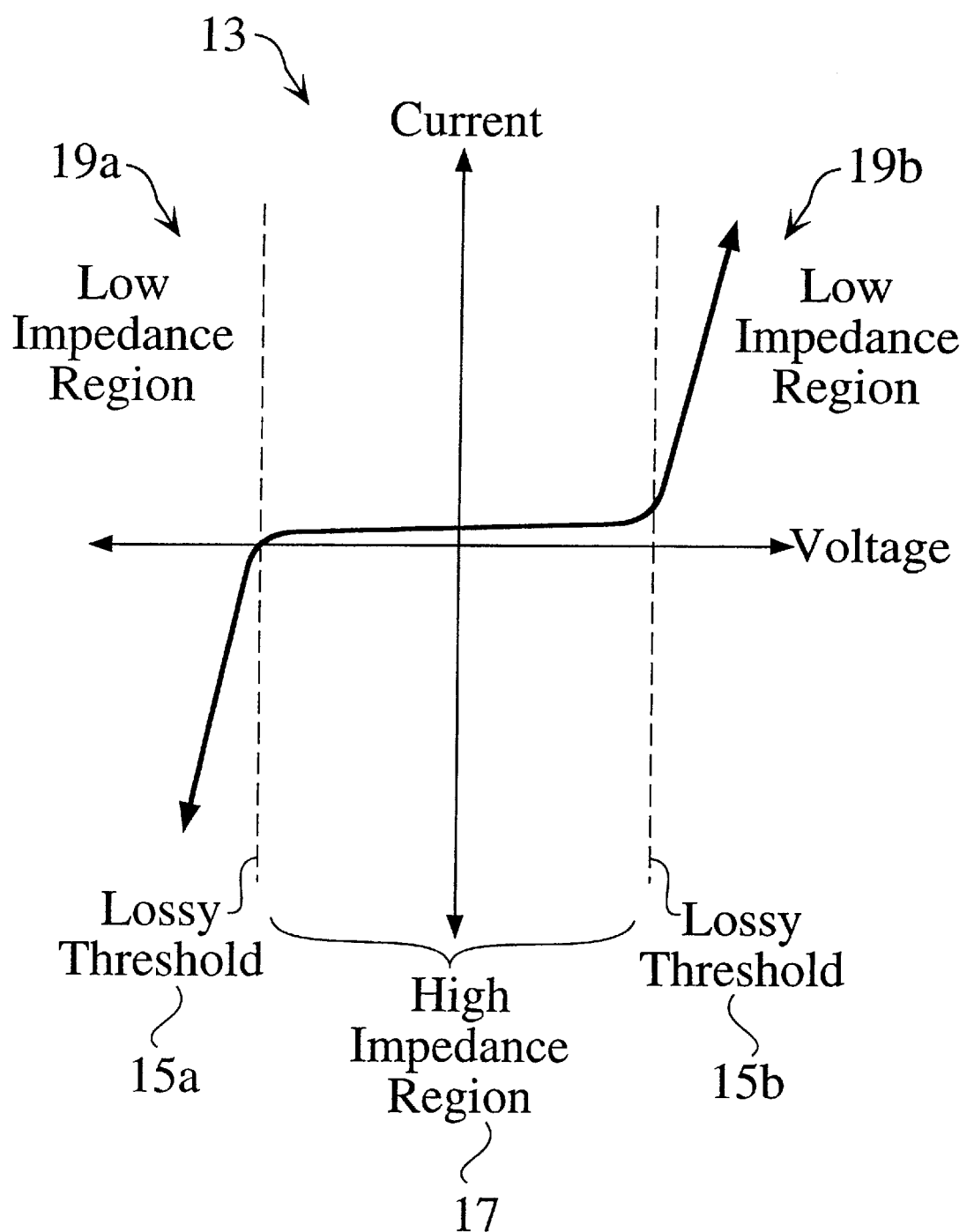
FIG. 2 is a graph showing the voltage to current characteristics of a non-linear device having lossy thresholds.

FIG. 2 is a graph 13 showing the voltage to current characteristics of a non-linear device 18 having lossy thresholds 15a, 15b. At low voltages, within the lossy thresholds 15a and 15b, voltage across the non-linear device 18 decays rapidly, which defines a high impedance region 17 for the non-linear device 18. At high positive or negative voltages, beyond the lossy thresholds 15a and 15b, voltage across the non-linear device 18 decays slowly, defining low impedance regions 19a,19b for the non-linear device 18.

Figure 3:
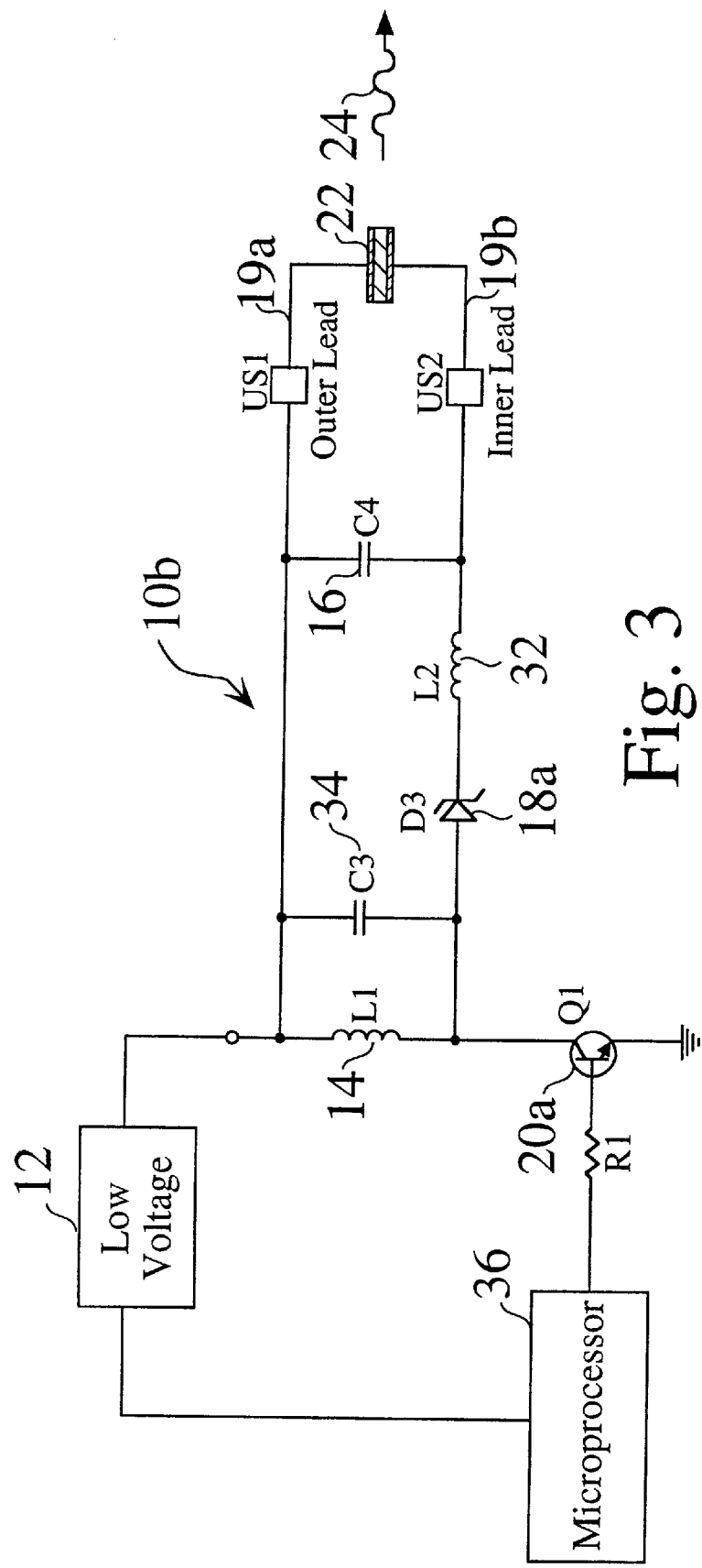
FIG. 3 is a schematic diagram of a signal waveshaping circuit.

The non-linear device 18 is typically a zener diode 18a, a triac diode 18b, a transistor 18c, or a tunnel diode 18d, or can be a combination of non-linear devices 10. In FIG. 1, the non-linear device 18 aids in the damping of signal waveforms 44 (FIG. 3). A selective switch 20, typically a microprocessor or microcontroller, allows the circuit to be controllably activated by the low voltage source 12.

The resulting signal waveshaping circuit 10 produces a short input pulse 44, which when connected to a piezoelectric transducer 22, excites the piezoelectric transducer 22, which resonates and transmits a shortened output signal 24 having distinct waveshape characteristics. The resulting waveshaped output signal 24, typically an ultrasonic signal 24, provides a measurable time-dependent signal that is particularly suited for movable transmitter pen and white board systems (FIGS. 9–21).

Figure 9:
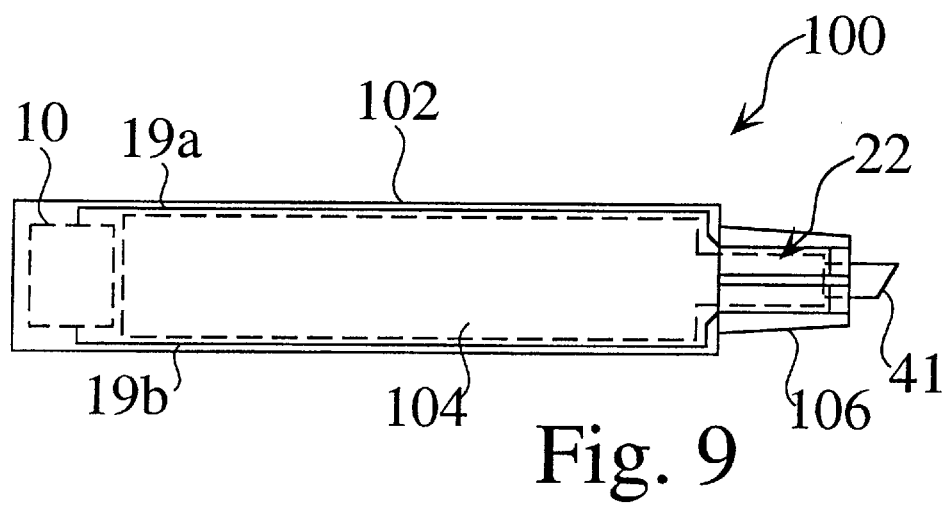
FIG. 9 shows a partial cutaway view of a transmitter pen having a signal waveshaping circuit connected to an ultrasonic piezoelectric transducer.

The transmitter circuitry 10 periodically excites the piezoelectric transmitter 22, to produce a pulse signal train of waveshaped output signals 24. In one embodiment, the pulse signal train has a frequency of 50 pulses per second. The periodic pulse signal train acts to update the location of the transmitter pen 40, as a user moves the transmitter pen 40 across a work area 114 of a white board 112 (FIG. 9).

Figure 4:
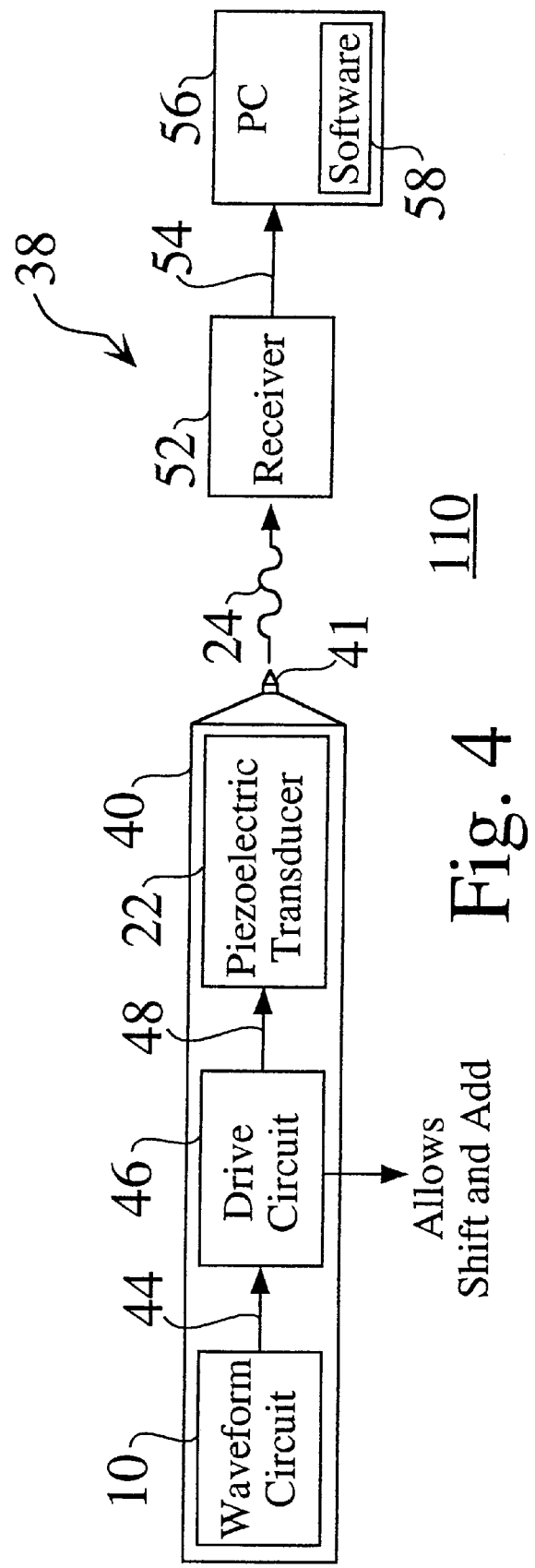
FIG. 4 is a block diagram showing the application of the signal waveshaping system within a transmitter pen and writing board system.

While the waveshaping system 10 is not required for a piezoelectric transmitter 22 to resonate and produce an output signal, the waveshaping system 10 allows piezoelectric transducers 22 to be driven with a high voltage, short pulse signal waveform 44, 48 (FIGS. 3,4). The input waveform 44,48 produces a sharp "ring" signal 24 from the piezoelectric transducer 22, by allowing the piezoelectric transmitter 22 to resonate quickly and turn off quickly, as a signal burst.

FIG. 3 is a schematic diagram of a preferred signal waveshaping circuit 10b. A primary 1 mH inductor 14 is coupled to primary 100 pF capacitor 16, to form an oscillator loop. A zener diode non-linear device 18a is located between the primary inductor 14 and the primary capacitor 16, and acts to dampen, or squelch, the output 44,48 (FIG. 4, FIG. 6, FIG. 7) of the circuit 10b.

A 4700 pF secondary capacitor 34 and a 8200 uH secondary inductor 32 are also added to this preferred signal waveshaping circuit 10b, which improve the performance of the circuit. The values chosen for the secondary capacitor 34 and the secondary inductor 32 are typically chosen to maximize the peak-to peak output voltage swing. The secondary capacitor 34 and secondary inductor 32 can be placed anywhere around the loop formed between the primary inductor 14 and the primary capacitor 16. In this embodiment, the zener diode 18a is Part No. 1N755, manufactured by Motorola, Inc., of Schaumburg, Ill.

The preferred signal waveshaping circuit 10b shown in FIG. 3 provides low power consumption with a high signal output 24 from the piezoelectric transducer 22. A microcontroller 36 provides a low level signal 44, which controls the width of the transducer signal pulses 44, and the distance between pulses 44. The microcontroller 36 can preferably activate the signal waveshaping circuit 10b to produce one or more closely spaced transducer signal pulses 72.

Figure 6:
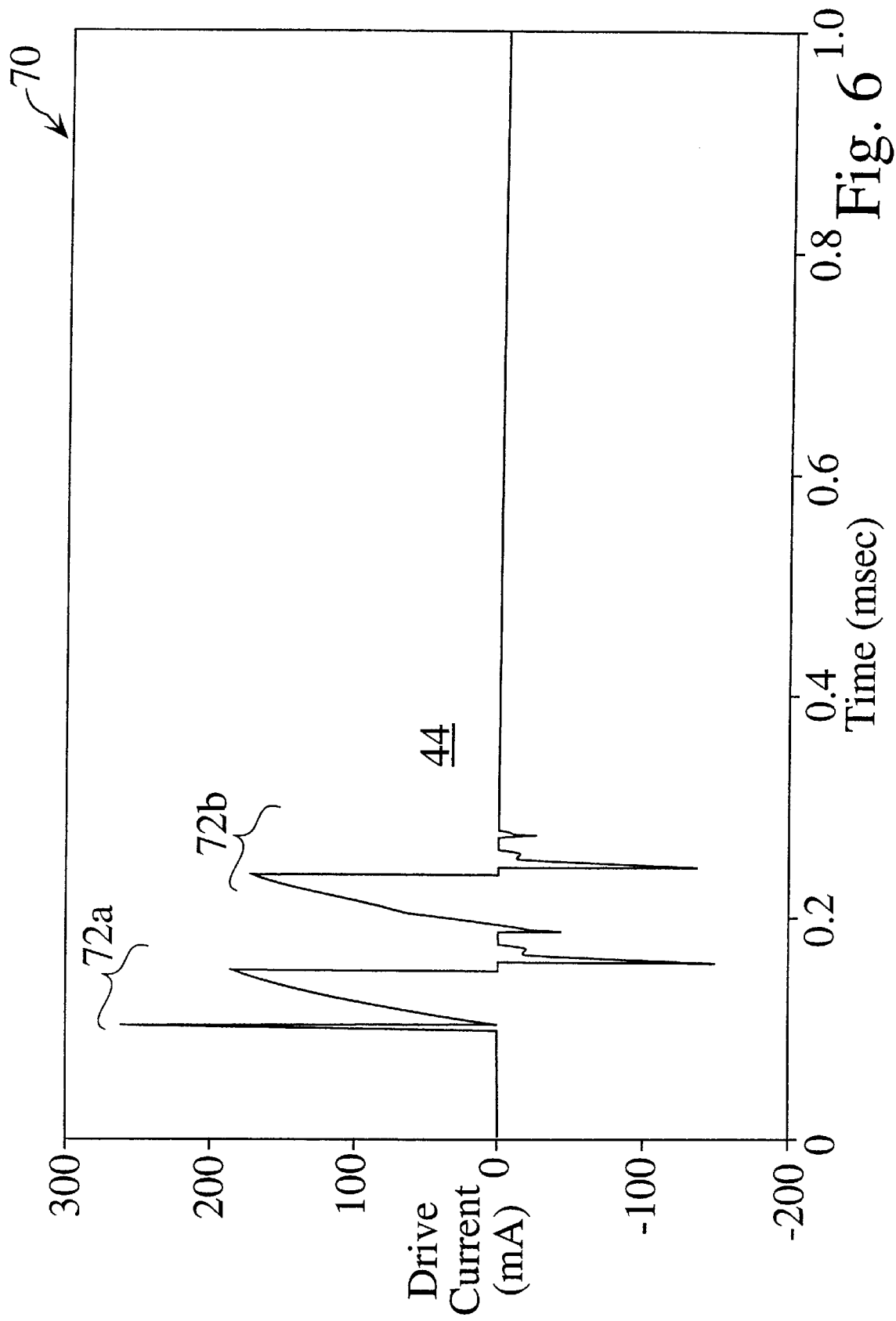
FIG. 6 is a graph showing drive current from a two pulse system to the waveshaping circuit primary inductor as a function of time.

For example, in one embodiment, the microcontroller 44 activates the signal waveshaping circuit 10b to produce two excitation pulses 72 within the transducer input signal 44, as shown in FIG. 6. The first pulse 72 from the transmitter circuitry starts the ultrasound signal 24, which produces a maximum amplitude. The second pulse 72 then dampens the ultrasound signal 24, once the maximum amplitude is achieved.

Figure 5:
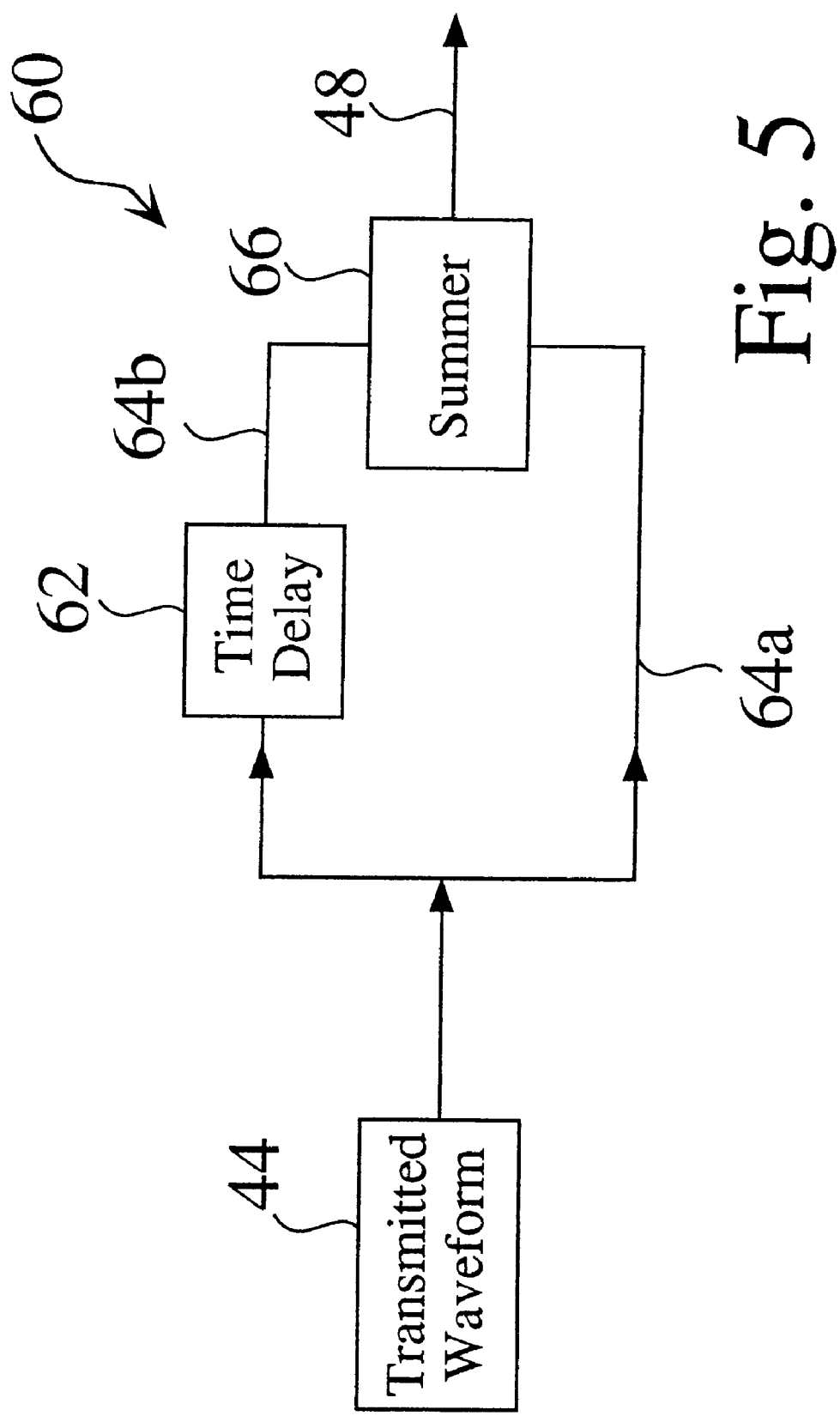
FIG. 5 is a block diagram showing delay combining techniques to produce complex transducer waveshape signals.

FIG. 4 is a block diagram 38 showing the application of the signal waveshaping system 10 within a transmitter pen and writing board system 110. In addition to the basic signal waveshaping circuit 10, a drive circuit 46 is preferably placed between the signal waveshaping circuit 10 and the piezoelectric transducer 22. A block diagram 60 of one embodiment of the drive circuit 46 is shown FIG. 5, which uses delay combining techniques to produce complex transducer waveshape signals 48. An incoming signal waveform 44 from the signal waveshaping circuit 10 is split or copied, and part of the signal is delayed or shifted by a time delay 62. The first signal path 64a and the second delayed signal path 64b are then combined in a summer 66, to form a complex transducer input signal 48.

Alternative embodiments of the drive circuit 46 allow the resulting waveshaped output signal 48 and subsequent transmission signal 24 to include even more distinctive and complex waveform features. The complex transmission signal 24 produced by the piezoelectric transducer 22 is fed by the input from the microcontroller 36, the waveforming circuit 10, and the drive circuit 46. The complex transmission signal 24 is sent from the transmitter pen 40 and is received by one or more receivers 52. The receiver 52 then transfers 54 the received transmitter signal 24 to a signal processor unit 56. The signal processor 56, which includes processing software 58, analyzes the waveform 24, along with waveforms 24 from other receivers 52, and calculates the location of the transmitter pen 40. The repeated waveform features inherent to each transmission signal 24 allow the distance between subsequent waveforms 24 to be measured with consistent accuracy.

An advantage of using a short wave-pulse drive circuit 46 is that more than one wavepulse can be combined, producing a tailored, characteristic wave shape, which is then supplied to a piezoelectric transducer 22, which transmits a shaped output pulse 24, or envelope, from the transmitter pen 40 to external receivers 52.

For a defined output pulse envelope, having characteristic waveform features, the receiver 52 can accurately define where on the received waveform 24 to designate as a starting point or endpoint. The receiver 52 can then accurately determine, in time, the distance between subsequent signals 24. Thus, the specific geometry of the transmitted waveform 24 gives more information than a generic, single long-ring waveform signal, and can more accurately define the time of arrival for the second waveform signal to the receiver 52.

Also, since the shape can be squelched quickly, the transmitter 22 is not required to wait as long to send the next output signal 24, and the frequency for the system can be increased. Higher system frequency allows a user to write faster with a transmitter pen 40 across a white board, while providing an accurate tracking signal for the transmitter pen 40.

Figure 7:
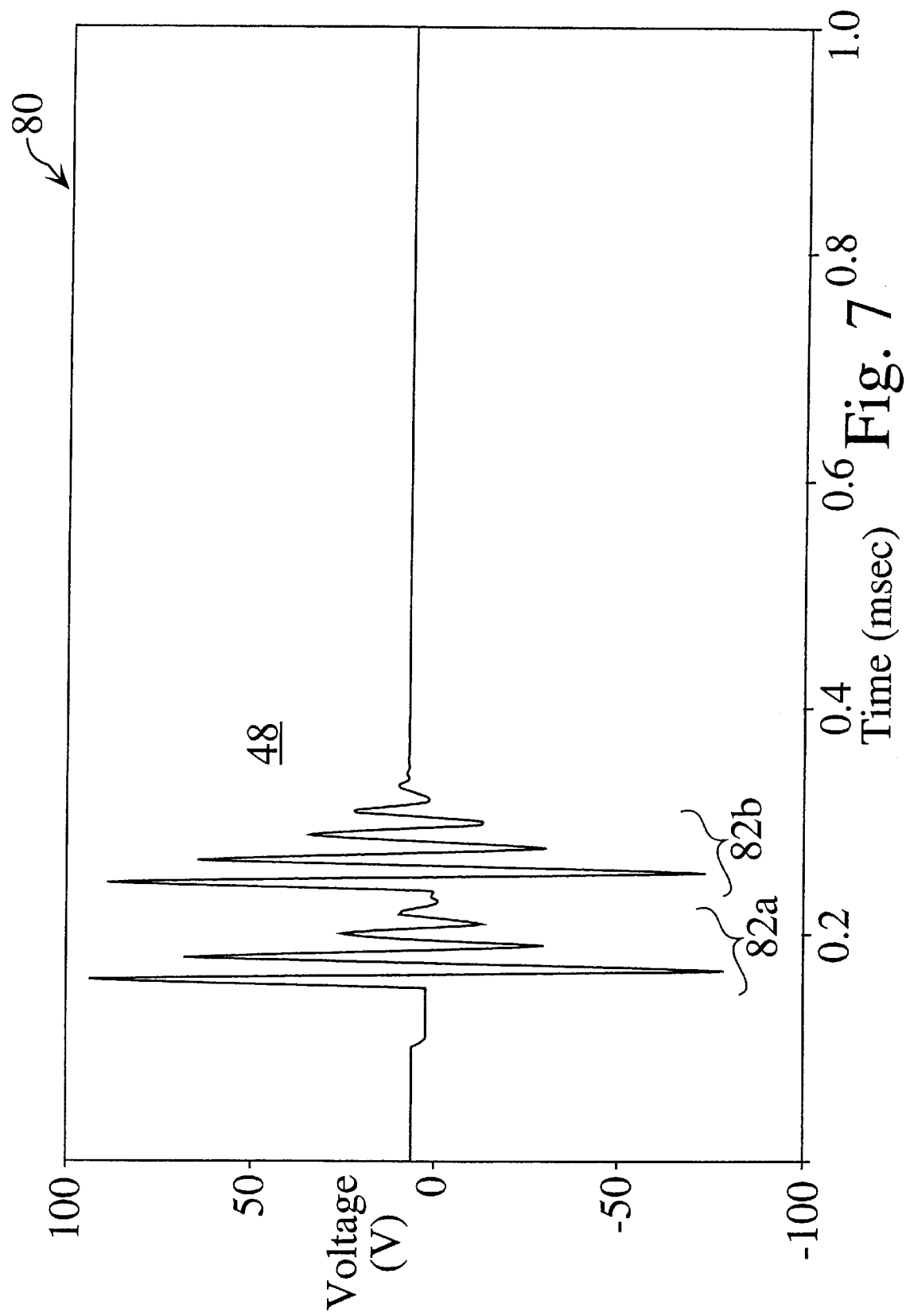
FIG. 7 is a graph showing drive voltage from a two pulse waveshaping circuit to an ultrasonic piezoelectric transducer as a function of time.

FIG. 6 is a graph 70 showing drive current from a two pulse system to the waveshaping circuit primary inductor 14, as a function of time. FIG. 7 is a graph 80 showing drive voltage from a two pulse waveshaping circuit 48 to an ultrasonic piezoelectric transducer 22, as a function of time.

Figure 8:
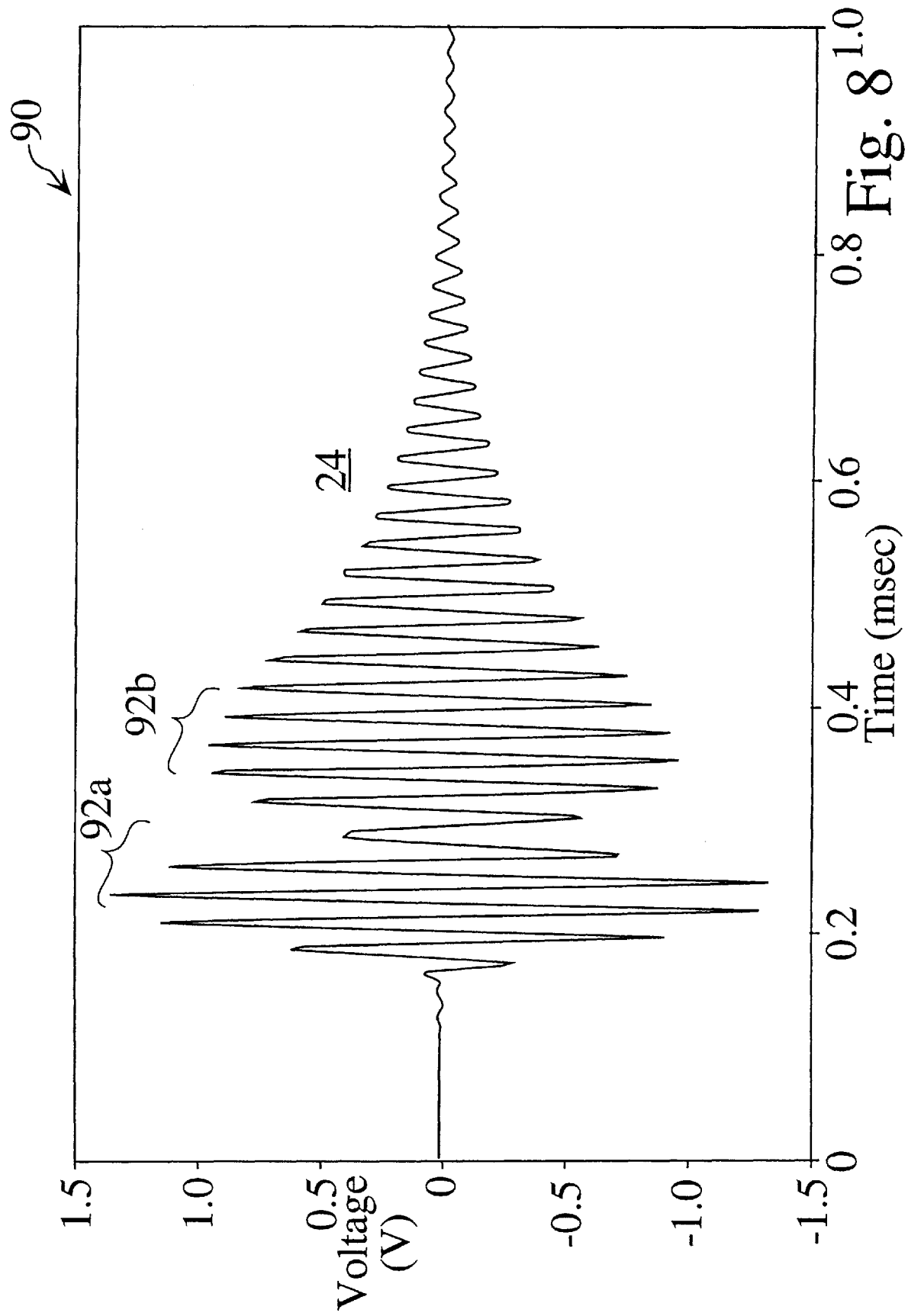
FIG. 8 is a graph showing a received voltage waveform from an ultrasonic piezoelectric transducer, powered by a two pulse waveshaping circuit, as a function of time.

The signal waveshaping system 10 allows the input signal 46,48 applied to the piezoelectric transducer 22, and the resulting output signal waveform 24 to have distinct characteristics. As shown in FIG. 6, one or more pulses 82a,82b may be applied to the transducer 22, at specified intervals. This customization allows better resolution of the received waveform 24, providing a more accurate determined location of the transmitter pen 40. The waveshaping also allows more elaborate information to be transmitted and determined. For example, FIG. 8 is a graph 90 showing a received complex voltage waveform 24 from an ultrasonic piezoelectric transducer 22, which includes peak features 92a and 92b, when activated by a two pulse waveshaping circuit 10. The distinctive waveform signal 24 can be selectively controlled in preferred embodiments, which provides a means for transferring supplementary information within the transmission signal 24 to remote receivers 52, such as pen up vs. pen down distinction, and determined pen characteristics, such as pen color, pen line width, and pen user.

In prior art systems, the output signal waveform has a wide profile, which fails to provide an accurate calculated position of a pen, and also requires a longer period between subsequent signals, resulting in less frequent pen location information.

Use of Waveshaping Circuit in Transmitter Pen and White Board Systems.

The waveshaping system 10 allows the use of time dependent waveform signals 24, such as ultrasonic waveforms 24, to be used in a number whiteboard systems, to accurately determine the location of transmitter pens 40. The distinct waveform 24 is transmitted from a transmitter pen 40, either alone, or in conjunction with other waveforms.

Figure 10:
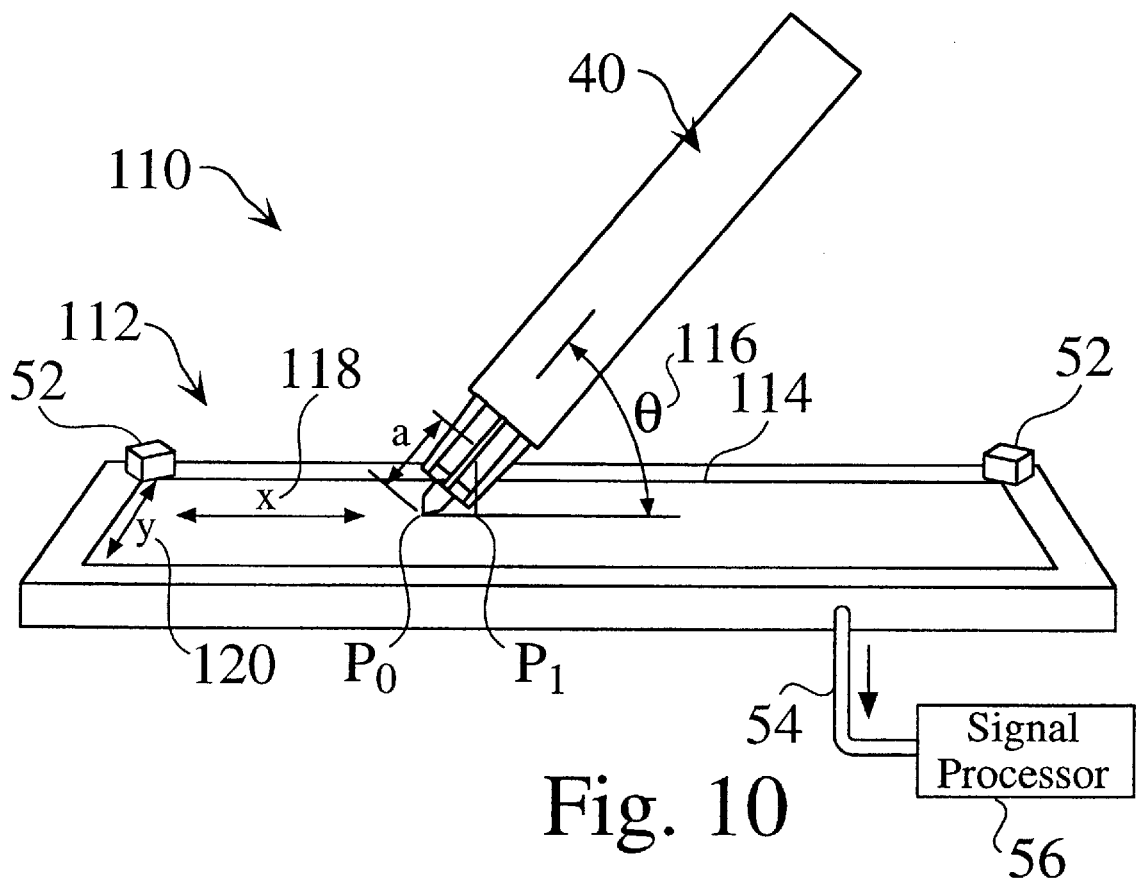
FIG. 10 illustrates the geometric relationship between an inclined transmitter pen and a white board.

FIG. 9 shows a partial cutaway view 100 of a transmitter pen 40 having a signal waveshaping circuit 10 connected through leads 19a,19b to an ultrasonic piezoelectric transducer 22, within a housing 102. A writing pen 104 is also located within the housing 102 which has a writing tip 41 located close to the piezoelectric transmitter 22. FIG. 10 illustrates the geometric relationship between an inclined transmitter pen 40 and a white board 112. The writing tip 41 of the pen defines a path 132 (FIG. 11) across the writing area 114 of the white board 112. Output signals 24 transmitted from the piezoelectric transducer 22 are received at receivers 52, and are processed at the signal processor 56, to determine the location of the pen 40, in relation to the X-axis 118 and Y-axis 120.

Pens can either include circuitry for a given pen "type", or can include switching or continuous adjustment control to produce a transmitter signal for a different pen "type". For example, a white board transmitter pen 40, containing only black ink, when held within a transmitter pen housing 102 (FIG. 9), may be selectively adjusted to produce signals 24 that correspond to drawn paths of varying colors, widths, or line styles.

For example, a distinctive waveform 24 can be transmitted from the transmitter pen 40 when the pen 40 is in a first "pen up" position. When the "pen up" signal 24 is received by the receiver 52, it is determined that the pen 40 is currently in its "pen up" position, and the X-Y coordinate of the pen 40 typical not calculated or stored.

Similarly, a distinctive waveform 24 is transmitted from the transmitter pen 40 when the pen is in a second "pen down" position. When the "pen down" signal 24 is received by the receiver 52, it is determined that the pen 40 is currently in its "pen down" position, and the X-Y coordinate of the pen 40 is determined. The "pen down" position typically means that the pen tip is in contact with either the surface of the writing board, or with another writing surface placed within the writing area 114, such as a piece of paper.

As the pen 40 is moved along a path 132 in the pen-down position, a series of pen-down signals are received and processed by the receivers 52, from which successive X-Y coordinates 132,136,138 are determined to produce a representation of the path 132 of the pen.

Waveshaping Circuit for Combined Signal System.

Figure 11:
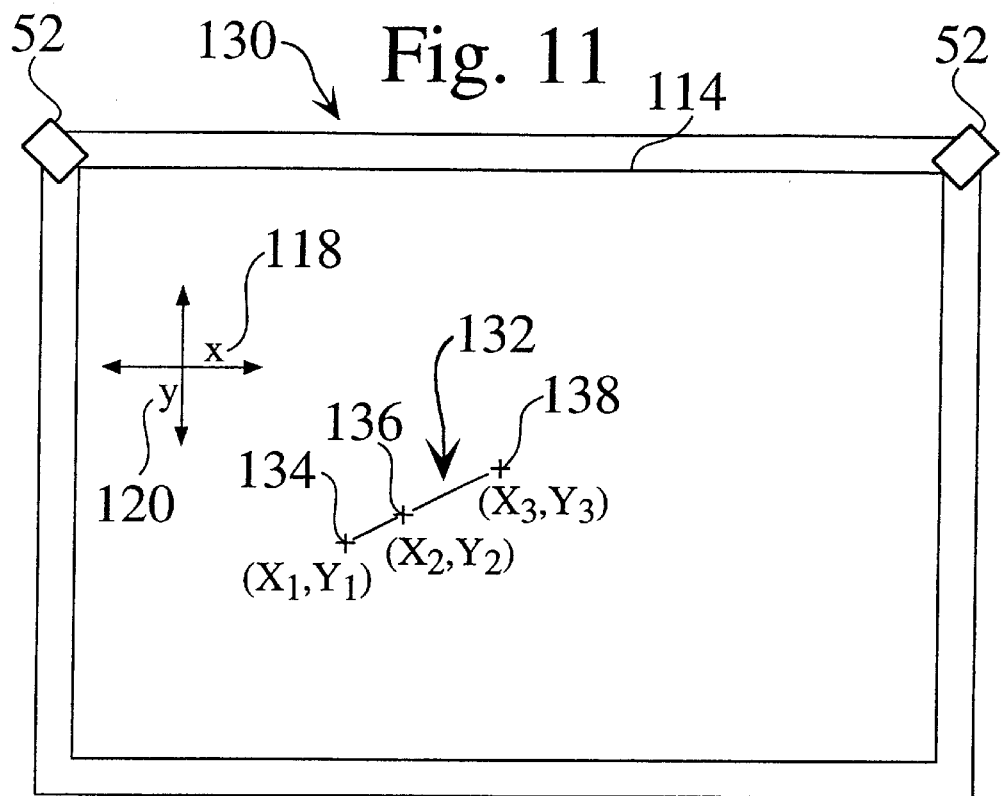
FIG. 11 shows the calculated x and y coordinates of a transmitter pen against a white board for a dual element transmitter pen.

FIG. 11 shows the calculated x and y coordinates of a transmitter pen 40 against a white board 130 for a dual element transmitter pen 40. In pen transmitter systems that use a combined transmitter signal 140, such as a first infrared signal 142 and a second ultrasound signal 24, the combined signal 140 is transmitted repeatedly, with a period defined between the transmission of subsequent signal pairs 140.

The distance between the infrared (IR) pulses 142 and the Ultrasound (US) waveform 24 acts to define the relative time to travel to different receivers 52. While the infrared pulses 142 travel at the speed of transmitted light, the ultrasound US signals 24 travel much slower, at the local speed of sound. Therefore, the relative speed of the combined output signal 140 is highly dependent on the time for the ultrasound component 24 to travel different distances to the plurality of receivers 52.

The accuracy of the location of the transmitter pen 40 is therefore dependent on the accuracy with which the circuitry can consistently determine the distance in time between the IR signal 140 and a portion on the ultrasound waveform 24.

While it is desirable to frequently update the location of the transmitter pen 40, the system typically is limited to a period that includes the time required for the second, slower, ultrasound signal 24 to travel from the piezoelectric transducer 22 the maximum distance across the white board display area 114 to the furthest receiver 52, such as across a diagonal of the writing area 114 shown in FIG. 11.

Figure 12:
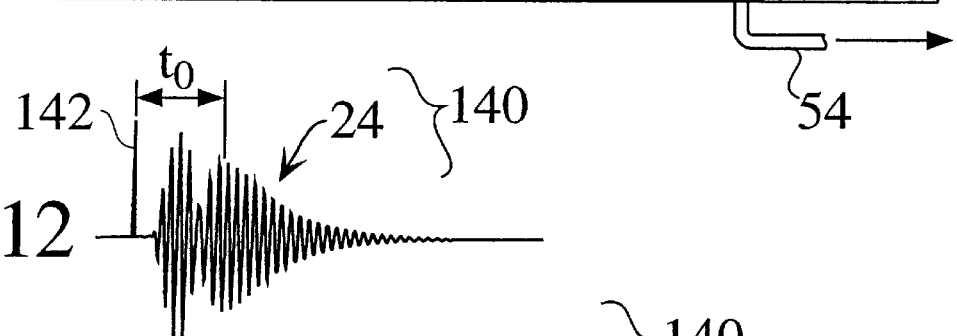
FIG. 12 shows a combined infrared-ultrasound pulse train signal as it is transmitted from a transmitter pen.
Figure 13:
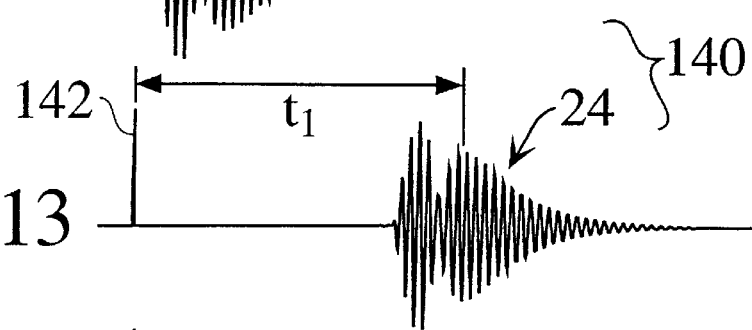
FIG. 13 shows a combined infrared-ultrasound pulse train signal as it is received at a first receiver location.
Figure 14:
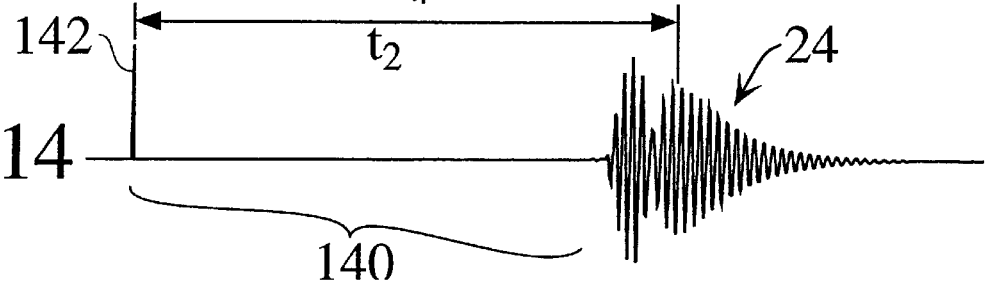
FIG. 14 shows a combined infrared-ultrasound pulse train signal as it is received at a second receiver location.

FIG. 12 shows a combined infrared-ultrasound pulse train signal 140 as it is transmitted from a transmitter pen 40. The writing system 130 sends a subsequent infrared signal 142 and ultrasound signal 24 from the transmitter pen 40 to the receivers 52. FIG. 13 shows a combined infrared-ultrasound pulse train signal 140 as it is received at a first receiver location 52. FIG. 14 shows a combined infrared-ultrasound pulse train signal 140 as it is received at a second receiver location 52.

As described above, the signal waveshaping system 10 allows the period between subsequent output signals 24 to be a minimum, since the waveform of the output signals 24 are effectively squelched. Therefore, the system provides both an accurate location for the transmitter pen 40 during each period, and also allows frequent updates of the location of the pen 40.

Use of Waveshaping Circuit in Ultrasound Transmitter System.

Figure 15:
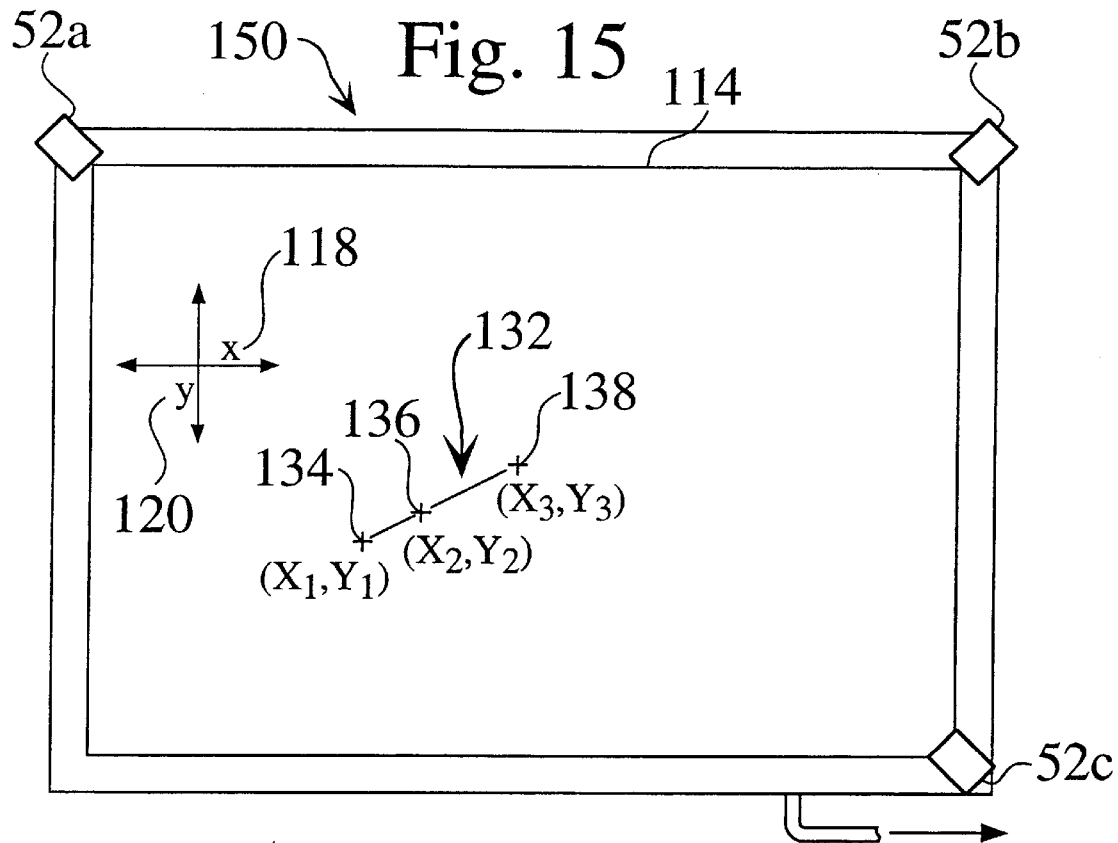
FIG. 15 shows a front view of an ultrasound transmitter pen and white board system.

The wave shaping system 10 can also be used for a transmitter system that uses a single transmitted ultrasound signal waveform 24 to arrive at three or more receiver locations 52. By using three or more receivers 52, one of the ultrasound signal paths 24 typically acts as a relative starting point for the others. FIG. 15 shows a front view of an ultrasound transmitter pen and white board system 150.

Figure 16:
FIG. 16 shows an ultrasound pulse train signal as it is received at a first receiver location in an ultrasound transmitter pen and white board system.
Figure 17:
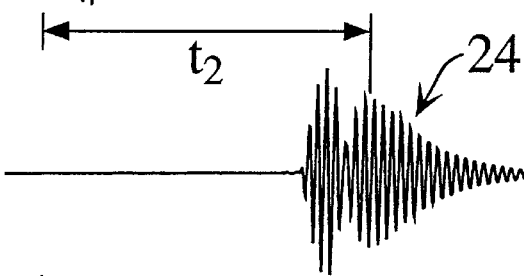
FIG. 17 shows an ultrasound pulse train signal as it is received at a second receiver location in an ultrasound transmitter pen and white board system.

In an ultrasound system 150, each signal period is started and is defined by the transmission of an ultrasound waveform 24. The ultrasound waveform 24 therefore defines both the start of the transmission, from the transmitter pen 40, and the end of the signal path to each of three or more receivers 52. FIG. 16 shows an ultrasound pulse train signal 24 as it is received at a first receiver location 52 at time $t_1$ in an ultrasound transmitter pen and white board system 150. FIG.

Figure 18:
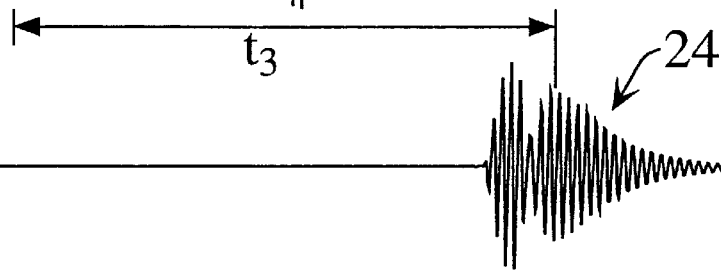
FIG. 18 shows an ultrasound pulse train signal as it is received at a third receiver location in an ultrasound transmitter pen and white board system.

17 shows an ultrasound pulse train signal 24 as it is received at a second receiver location 52 at time $t_2$ in an ultrasound transmitter pen and white board system 150. FIG. 18 shows an ultrasound pulse train signal 24 as it is received at a third receiver location 52 at time $t_3$ in an ultrasound transmitter pen and white board system 150. The relative time for the ultrasound signal 24 to arrive at the three receiver locations 52 provides an X-Y location of the transmitter pen 40.

In the prior art, an unshaped ultrasound waveform provides a relatively wide signal to designate both the start and the end of the transmission signal, which can lead to an inaccurate determined location of a pen.

In contrast, the transducer waveshaping system 10 provides a more definite starting and ending point for the ultrasound waveform 24, which provides a more accurate location for the transmitter pen 40, and as above, allows the period between subsequent output signals to be minimized, allowing more frequent updates of the pen location.

Use of Waveshaping Circuit in Phase Array Transmitter System.

Figure 19:
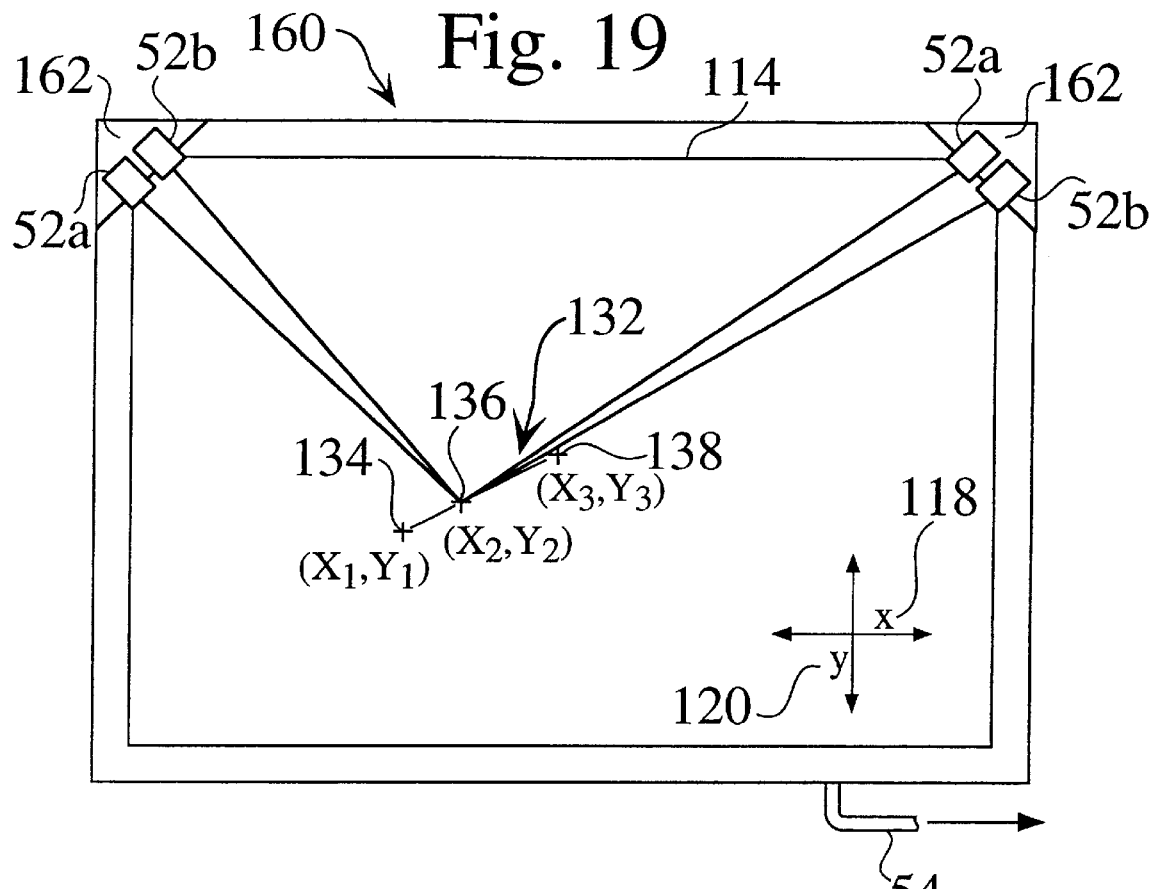
FIG. 19 shows a front view of a phase array ultrasound transmitter pen and white board system.

In a phase array transmitter pen location system, the direction of the transmitter pen 40 is determined, in relation to a plurality of receiver pair sites 162. FIG. 19 shows a phase array transmitter pen and white board system 160, which is considered to be a direction of arrival (DOA) system.

A first receiver pair 162 is located along the periphery of a writing area 114, and includes a first receiver 52a and a second receiver 52b, located close to each other, typically within one half of the wavelength of the ultrasound waveform 24. A second receiver pair 162 is located elsewhere along the periphery of a writing area 114, and also includes a first receiver 52a and a second receiver 52b.

Figure 20:
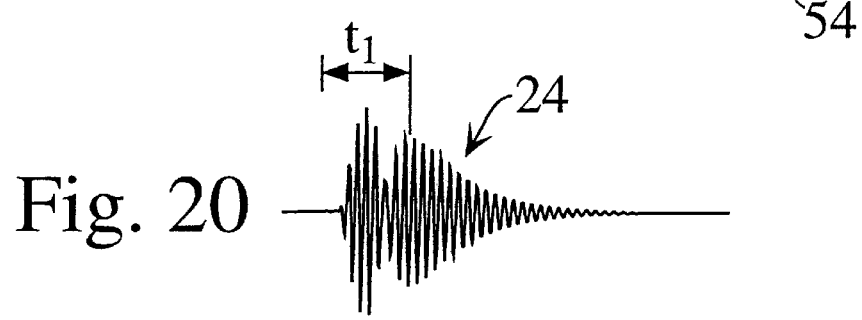
FIG. 20 shows an ultrasound pulse train signal as it is received at a first receiver pair location in a phase array transmitter pen and white board system.
Figure 21:
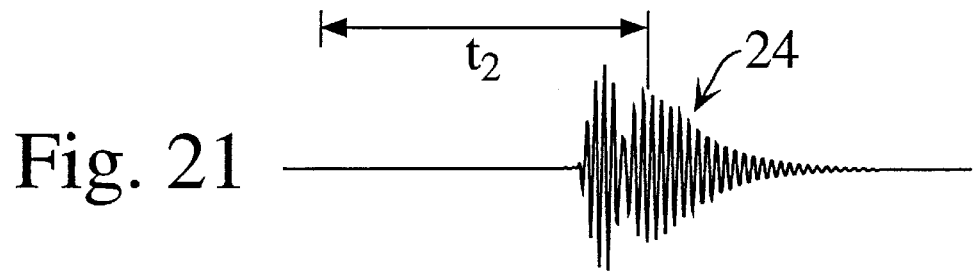
FIG. 21 shows an ultrasound pulse train signal as it is received at a second receiver pair location in a phase array transmitter pen and white board system.

FIG. 20 shows an ultrasound pulse train signal 24 as it is received and processed at a first receiver pair location 162 in a phase array transmitter pen and white board system 160. FIG. 21 shows an ultrasound pulse train signal 24 as it is received and processed at a second receiver pair location 162 in a phase array transmitter pen and white board system 160.

When an output signal 24 from a transmitter pen arrives at the first receiver 52a and the second receiver 52b at the first receiver pair 162, the offset distance and angle between the first receiver 52a and the second receiver 52b is determined, which gives a difference in path length. From the difference in path length, the direction of the transmitter pen 40 to the first receiver pair 162 is determined.

Similarly, the direction of the transmitter pen 40 in relation to the second receiver pair 162 is determined, as the transmitted signal 24 arrives at the first receiver 52a and the second receiver 52b within the second receiver pair 162. The phase array system 160 then determines the location of the transmitter pen 40, by solving for the calculated pen X-Y location that is consistent with the determined directions from each of the receiver pairs 162.

Figure 22:
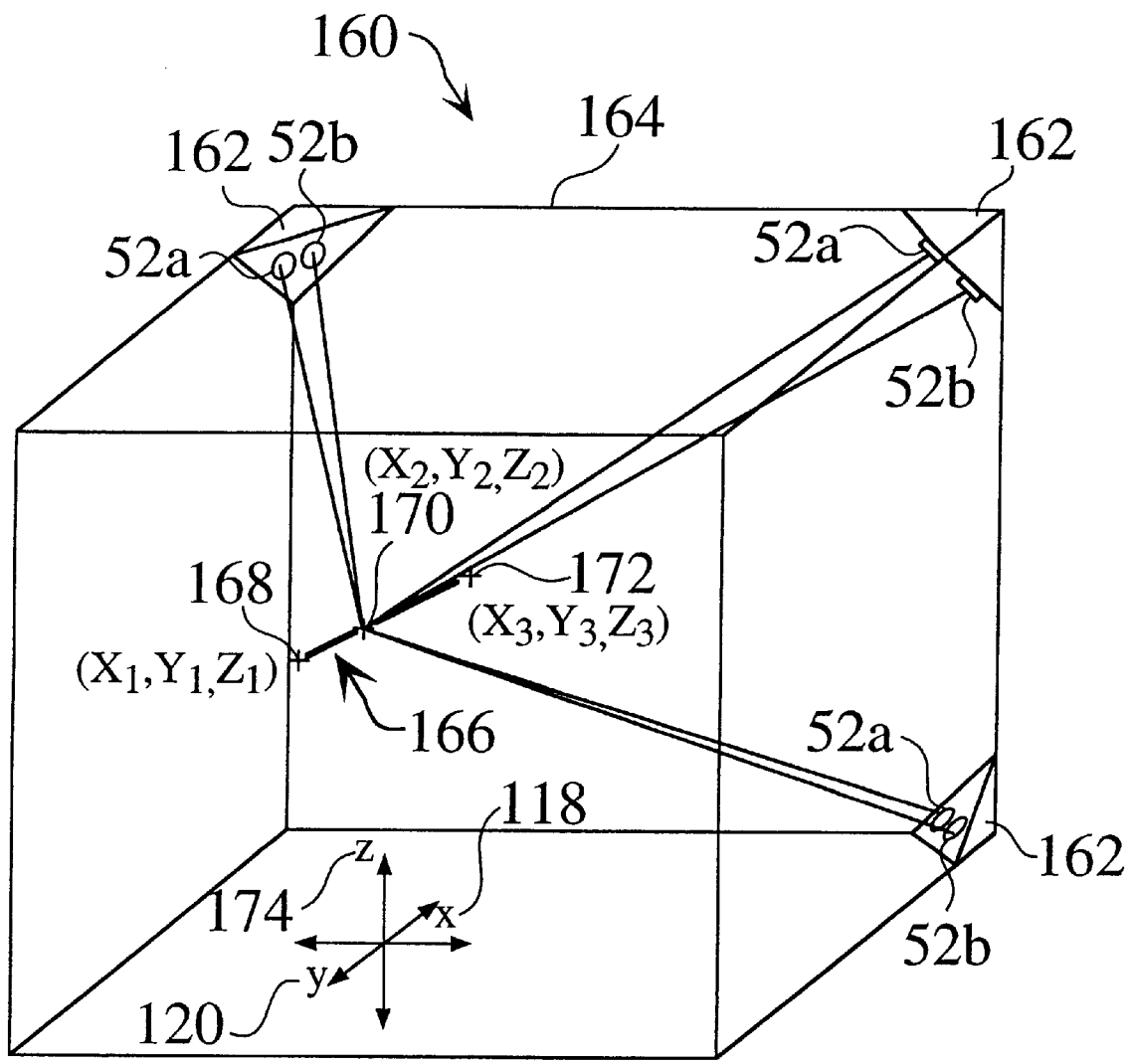
FIG. 22 shows a perspective view of a three-dimensional phase array ultrasound transmitter pointer system.

An alternate embodiment of a phase array system 160 is shown in FIG. 22, in which a third receiver pair 162, having a first receiver 52a and a second receiver 52b, is located along the periphery of a writing volume 164, wherein a transmitter pen 40 provides a three-dimensional location signal 24. The transmitter pen or pointer 40 can be used anywhere within a defined writing volume 164, and the determined direction to the three receiver pairs 162a, 162b and 162c provides a current calculated X-Y-Z location for the transmitter pointer 40, in relation to an X-axis 118, a Y-axis 120, and a Z-axis 174.

Similarly, alternate embodiments of the combined signal system (FIG. 11) and the ultrasound transmitter system (FIG. 14) may include additional receivers 52 along the periphery of a writing volume 164, wherein the transmitter pen 40 provides a three-dimensional location signal 24. The transmitter pen or pointer 40 can be used anywhere within a defined writing volume 164, and the determined direction to the receivers 52 provides a current calculated X-Y-Z location for the transmitter pointer 40, in relation to an X-axis 118, a Y-axis 120, and a Z-axis 174.

Although the signal waveshaping system 10 and its methods of use are described herein in connection with transmitter pen and white board systems, the techniques can be implemented for other computer input, control or display devices, or any combination thereof, as desired.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. A circuit, connectable to a low voltage source having a first end and a second end, said circuit comprising:
   a capacitor having a first side and a second side;
   an inductor having a first end and a second end, said first end of said inductor connected to said first side of said capacitor;
   means for connecting said first end of said inductor to said first end of said low voltage source;
   a non-linear device having a first end and a second end and having a lossy threshold, said first end of said non-linear device connected to said second end of said inductor, said second end of said non-linear device connected to said second side of said capacitor;
   a selective switch connected to said second end of said inductor; and
   means for connecting said selectable switch to said second end of said low voltage source.

2. The circuit of claim 1, wherein said non-linear device is a zener diode.

3. The circuit of claim 1, wherein said non-linear device is a triac diode.

4. The circuit of claim 1, wherein said non-linear device is a transistor.

5. The circuit of claim 1, wherein said non-linear device is a tunnel diode.

6. The circuit of claim 1, further comprising:
   a piezoelectric transducer having a first lead and a second lead, wherein said first lead is connected to said first side of said capacitor, and wherein said second lead is connected to said second side of said capacitor.

7. The circuit of claim 6, wherein said piezoelectric transducer is an ultrasonic piezoelectric transducer.

8. The circuit of claim 1, further comprising:
   a secondary capacitor connected between said first end of said inductor and said second end of said inductor.

9. The circuit of claim 1, further comprising:
   a secondary inductor connected between said second end of said non-linear device and said second side of said capacitor.

10. The circuit of claim 1, wherein said selective switch is a microprocessor.

11. The circuit of claim 1, wherein said selective switch is a microcontroller.

12. A transducer waveshaping system, comprising:
    an oscillation loop formed by a capacitor having a first side and a second side, an inductor having a first end and a second end, said first end of said inductor connected to said first side of said capacitor, and a non-linear device having a first end and a second end, said first end of said non-linear device connected to said second end of said inductor, said second end of said non-linear device connected to said second side of said capacitor;

an input loop formed by a voltage supply circuit connected to a selective switch, said input loop connected between said first end of said inductor and said second end of said inductor;

a first output lead connected to said first side of said capacitor; and a second output lead connected to said second side of said capacitor.

13. The transducer waveshaping system of claim 12, wherein said non-linear device is a zener diode.

14. The transducer waveshaping system of claim 12, wherein said non-linear device is a triac diode.

15. The transducer waveshaping system of claim 12, wherein said non-linear device is a transistor.

16. The transducer waveshaping system of claim 12, wherein said non-linear device is a tunnel diode.

17. The transducer waveshaping system of claim 12, further comprising:

a piezoelectric transducer having a first lead end and a second lead end, wherein said first lead end is connected to said first output lead, and wherein said second lead end is connected to said second output lead.

18. The transducer waveshaping system of claim 17, wherein said piezoelectric transducer is an ultrasonic piezoelectric transducer.

19. The transducer waveshaping system of claim 12, further comprising:

a secondary capacitor connected between said first end of said inductor and said second end of said inductor.

20. The transducer waveshaping system of claim 12, further comprising:

a secondary inductor located within said oscillation loop.

21. The transducer waveshaping system of claim 12, wherein said selective switch is a microprocessor.

22. The transducer waveshaping system of claim 12, wherein said selective switch is a microcontroller.

* * * * *